United States Patent [19]
Yamaji et al.

[11] Patent Number: 6,116,282
[45] Date of Patent: Sep. 12, 2000

[54] FLUID CONTROL DEVICE

[75] Inventors: Michio Yamaji; Tsutomu Shinohara, both of Osaka, Japan

[73] Assignee: Fujikin Incorporated, Osaka, Japan

[21] Appl. No.: 09/344,375

[22] Filed: Jun. 25, 1999

[30] Foreign Application Priority Data

Jun. 30, 1998 [JP] Japan .................................. 10-183201

[51] Int. Cl.[7] ................................................. F16K 11/10
[52] U.S. Cl. .......................................... 137/884; 137/613
[58] Field of Search .................................. 137/884, 271, 137/613

[56] References Cited

U.S. PATENT DOCUMENTS

| | | | |
|---|---|---|---|
| 3,152,614 | 10/1964 | Carls | 137/625.69 |
| 3,817,269 | 6/1974 | Raymond | 137/269 |
| 5,819,782 | 10/1998 | Itafuji | 137/240 |
| 5,983,933 | 11/1999 | Ohmi et al. | 137/597 |
| 5,988,217 | 11/1999 | Ohmi et al. | 137/614.2 |

FOREIGN PATENT DOCUMENTS 0 816 731 A2  1/1998  European Pat. Off. .

*Primary Examiner*—John Fox
*Attorney, Agent, or Firm*—Armstrong, Westerman, Hattori, McLeland & Naughton

[57] ABSTRACT

A massflow controller and block valves are each fastened to block couplings adjacent to each other by screw members screwed in from above like a bridge and are thereby made removable upward. The block couplings are fastened to a base plate by screw members left uncovered with the fluid control members when seen from above.

2 Claims, 5 Drawing Sheets

FLUID CONTROL DEVICE

BACKGROUND OF THE INVENTION

The present invention relates to fluid control devices, for example, for use in fabricating semiconductors, and more particularly to fluid control devices which comprise a control unit such as a massflow controller for controlling a flow rate or pressure regulator for regulating pressure, and on-off valves or the like in combination with the control unit.

The terms "upper" and "lower" as used herein refer respectively to the upper and lower sides of each drawing. These terms are used for convenience' sake; the device may be used as turned upside down or as laid on its side.

Fluid control devices for use in fabricating semiconductors comprise the combination of a control unit such as a massflow controller for controlling a flow rate or pressure regulator, and on-off valves or the like. We have already proposed a fluid control device of this type having a preferred construction which comprises a plurality of fluid control members arranged at an upper stage and a plurality of couplings arranged at a lower stage, at least one of the fluid control members comprising a blocklike body attached to some of the couplings so as to be removable upward and a plurality of monofunctional members mounted on the blocklike body as a unit (see Japanese Patent Application No. 278495/1997, and corresponding U.S. patent application Ser. No. 09/168,856).

FIGS. 4 and 5 show an example of such a fluid control device. In the following description, the terms "left" and "right" refer respectively to the left-hand side and the right-hand side of FIGS. 2 and 5, the term "front" refers to the front side of the plane of each of these drawings, and the term "rear" to the rear side thereof.

With reference to FIGS. 4 and 5, the fluid control device 1 comprises a plurality of block couplings 5, 6, 7, 8, 9, 10 fastened to a base plate 11, and different kinds of fluid controllers 2, 3, 4 each attached to some of these block couplings 5 to 10.

The fluid controllers 2, 3, 4 are a first block valve 2, massflow controller (controller) 3 and second block valve 4 as arranged from the left rightward. The block couplings 5 to 10 are arranged from the left rightward in this order. The block coupling 5 is formed with a first V-shaped channel 5a having an upward left opening and an upward right opening. The block coupling 6 is formed with a first L-shaped channel 6a having an upward opening and a rearward opening. The block coupling 7 is formed with a second V-shaped channel 7a having an upward left opening and an upward right opening. The block coupling 8 is formed with a third V-shaped channel 8a having an upward left opening and an upward right opening. The block coupling 9 is formed with a second L-shaped channel 9a having an upward opening and a rearward opening. The block coupling 10 is formed with a third L-shaped channel 10a having an upward opening and a rightward opening.

Each of the block couplings 5 to 10 is formed with through bores 25 and screw bores 26 and fastened to the base plate 11 by inserting a bolt (not shown) through each bore 25 and screwing the bolt into a screw bore (not shown) in the base plate. Each of the fluid controllers 2, 3, 4 is fastened to some of the block couplings 5 to 10 corresponding thereto by inserting a bolt 27 through the controller from above and screwing the bolt 27 into each of the screw bores 26 in the corresponding couplings.

The first block valve 2 comprises a blocklike body 12 in the form of a rectangular parallelepiped elongated rightward or leftward (i.e., longitudinally of the device), a first actuator 13 and a second actuator 14 which are mounted on the upper side of the body 12, a right block 15 formed with an inverted L-shaped channel 15a and attached to the right side of the body 12, and a rear block 16 formed with an inverted L-shaped channel (not shown) and attached to the rear side of the body 12. The body 12 has a left end portion attached to the right half portion of the block coupling 5 having the first V-shaped channel 5a. The right block 15 is attached to the left half portion of the block coupling 7 having the second V-shaped channel 7a. The rear block 16 is attached to the block coupling 6 having the first L-shaped channel 6a.

The body 12 of the first block valve 2 is formed with a first inflow channel 31 having a downward opening at its left end portion and communicating with the right opening of the block 5 having the first V-shaped channel 5a, an outflow channel 32 communicating with the first inflow channel 31 through the first actuator 13 and with a rightward portion of the inverted L-shaped channel 15a of the right block 15, and a second inflow channel 33 communicating with the outflow channel 32 through the second actuator 14 and with the upward opening of the block coupling 6 having the first L-shaped channel 6a. The inverted L-shaped channel 15a of the right block 15 has a downward portion in communication with the left opening of the block coupling 7 having the second V-shaped channel 7a.

The controller 3 has a left block 17 projecting leftward from the lower end portion of its left side and formed with an inverted L-shaped channel 17a in communication with an inflow channel (not shown) of the controller 3. Projecting rightward from the lower end portion of right side of the controller 3 is a right block 18 having an inverted L-shaped channel 18a in communication with an outflow channel (not shown) of the controller 3. The left block 17 is attached to the right half portion of the block coupling 7 having the second V-shaped channel 7a, whereby the inverted L-shaped channel 17a of the left block 17 is held in communication with the inverted L-shaped channel 15a of right block 15 of the first block valve 2 by the block coupling 7 having the channel 7a. The right block 18 of the controller 3 is attached to the left half portion of the block coupling 8 having the third V-shaped channel 8a.

The second block valve 4 comprises a blocklike body 19 in the form of a rectangular parallelepiped elongated longitudinally of the device, a third actuator 20 and a fourth actuator 21 which are mounted on the upper side of the body 19, a right block 22 formed with an inverted L-shaped channel 22a and attached to the right side of the body 19, and a rear block 23 formed with an inverted L-shaped channel and attached to the rear side of the body 19. The body 19 has a left end portion attached to the right half portion of the block coupling 8 having the third V-shaped channel 8a. The right block 22 is attached to the block coupling 10 having the third L-shaped channel 10a. The rear block 23 is attached to the block coupling 9 having the second L-shaped channel 9a. The block coupling 10 having the third L-shaped channel 10a is provided at its rightward opening with a fluid outlet member 24.

The body 19 of the second block valve 4 is formed with an inflow channel 34 having a downward opening at its left end portion and communicating with the right opening of the block 8 having the third V-shaped channel 8a, a first outflow channel 35 communicating with the first inflow channel 34 through the third actuator 20 and with a rightward portion of the inverted L-shaped channel 22a of the right block 22, and a second outflow channel 36 communicating with the first outflow channel 35 through the fourth actuator 21 and with the upward opening of the block coupling 9 having the second L-shaped channel 9a. The inverted L-shaped channel 22a of the right block 22 is in communication with the third L-shaped channel 10a of the block coupling 10.

A fluid coupling 30 is provided at each of joints where the members 5, 2, 6, 15, 7, 17, 18, 8, 4, 9, 22, 10 are joined to one another.

With the fluid control device 1 described, each of the first and second block valves (fluid control members) 2, 4 comprises a blocklike body 12 (19) and a plurality of actuators (monofunctional members for opening and closing a fluid channel) 13, 14 (20, 21) mounted on the blocklike body as a unit. This construction makes it possible to reduce the number of components such as blocklike bodies and seal members. The device further has the advantage of being easy to maintain because if there arises a need to replace one of the monofunctional members, the fluid control member can be removed upward for the replacement of the required monofunctional member.

No problem is encountered with the device described in removing the massflow controller or block valve singly, whereas the massflow controller is not removable with the opening or closing of the inlet and outlet of the controller made controllable by the block valves, hence the problem of inconvenient maintenance. The fluid control device has another problem. The device is assembled by fully fastening the block couplings to the base plate with screw members and subsequently attaching each fluid control member to some of the block couplings to bridge the couplings. Difficulty is therefore encountered in attaching the fluid control member if the block couplings are not positioned in place accurately.

SUMMARY OF THE INVENTION

An object of the present invention is to provide a fluid control device which is improved in the ease of maintenance and in assembling work efficiency by making it possible not only to remove a massflow controller or valve alone singly but also to remove the massflow controller with the valve adapted to control the opening or closing of the inlet or outlet of the controller.

The present invention provides a fluid control device comprising a plurality of fluid control members arranged at an upper stage, and a plurality of block couplings arranged at a lower stage, the control device being characterized in that each of the fluid control members is fastened to the block couplings adjacent to each other like a bridge by screw members screwed in from above so as to render the control member removable upward, the block couplings being fastened to a base plate by screw members left uncovered with the fluid control members when seen from above.

Examples of fluid control members are on-off valves, pressure regulators, filters, pressure sensors, units each comprising a single blocklike body and two or three on-off valves mounted on the body, units each comprising a single blocklike body, and a pressure regulator and a pressure sensor which are mounted on the body, etc.

Each of the fluid control members can be removed singly by removing the screw members fastening the fluid control member to the block couplings concerned. Some of the fluid control members can also be removed as connected to one another by removing the specified screw members among the screw members fastening the fluid control members to the block couplings and those fastening the block couplings to the base plate. Accordingly, different methods of removing are usable in accordance with the state of the device to be handled for maintenance, hence facilitated maintenance.

The fluid control device of the invention can be assembled by temporarily fastening the block couplings to the base plate with screw members first, attaching each fluid control member to some of the block couplings as specified like a bridge, and finally tightening up the screw members temporarily fastening the couplings. Unlike the conventional device wherein each fluid control member is attached to some of the block couplings concerned to bridge the couplings after the couplings have been fastened to the base plate by tightening up screw members, the block couplings can then be slightly movable when mounting the fluid control members, which can therefore be installed with correspondingly increased ease.

DESCRIPTION OF THE PREFERRED EMBODIMENT

An embodiment of the present invention will be described below with reference to the drawings concerned.

Figure 1:
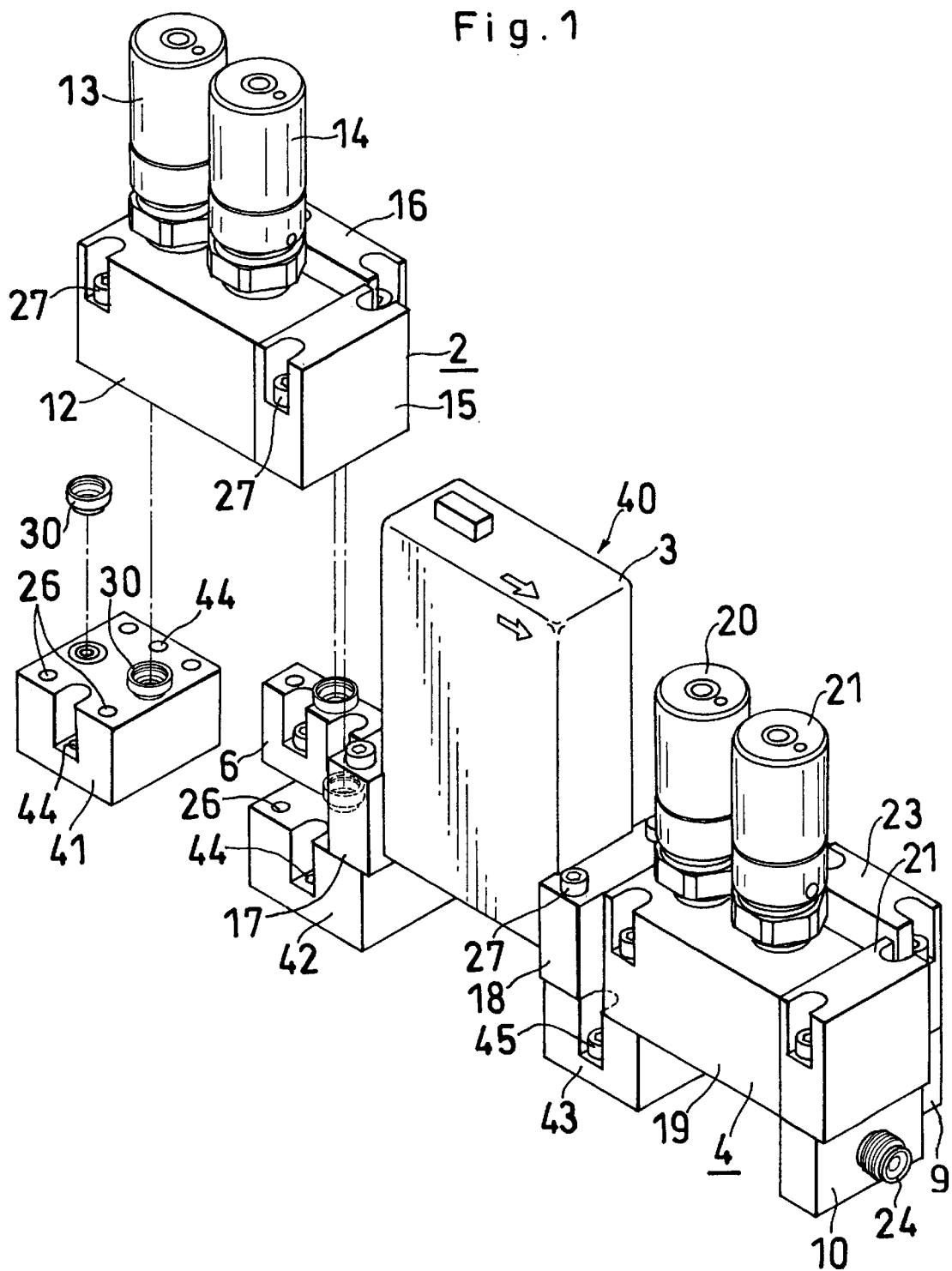
FIG. 1 is an exploded perspective view of a fluid control device embodying the invention.
Figure 2:
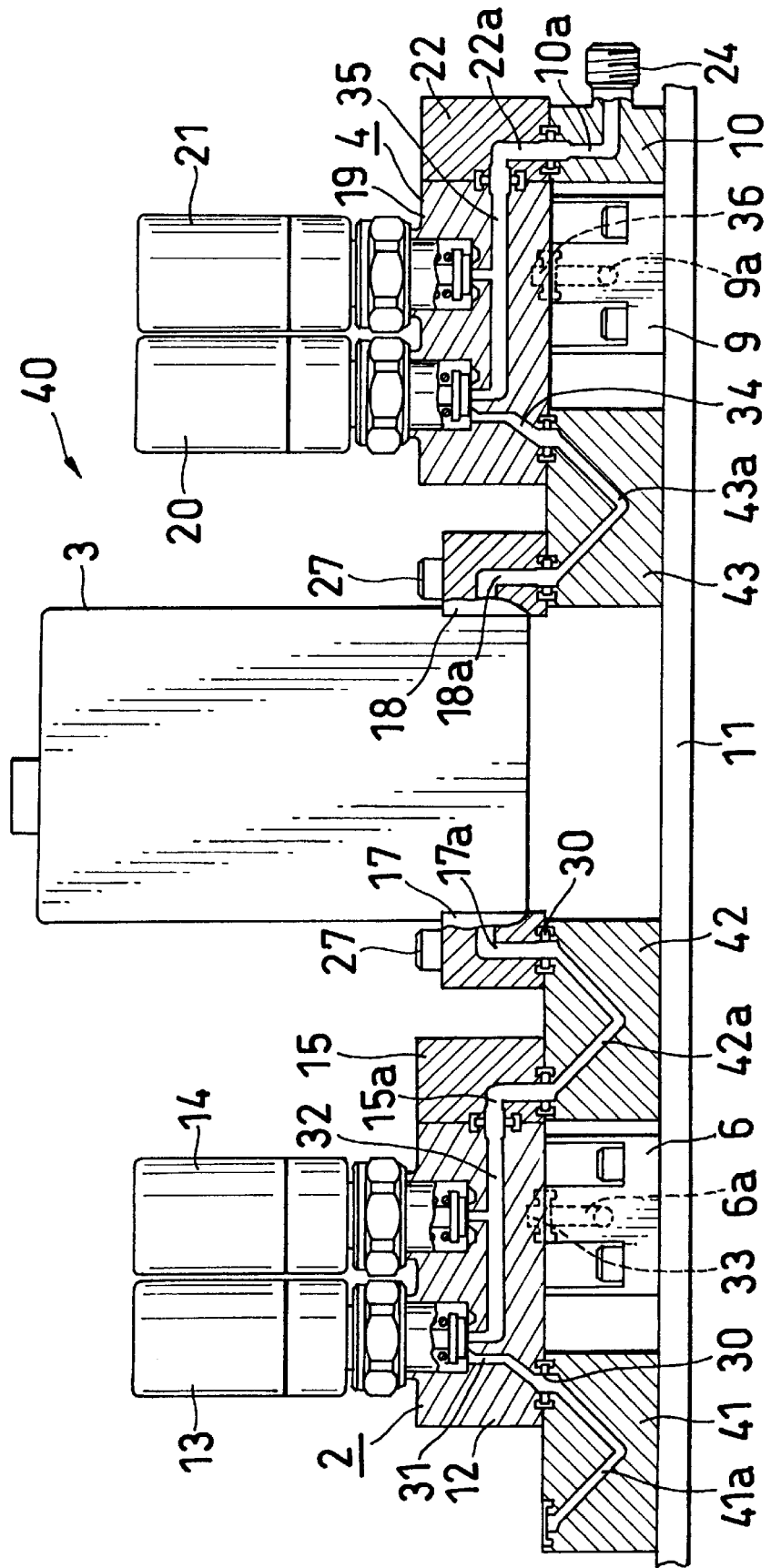
FIG. 2 is a view in vertical section of the same.
Figure 3:
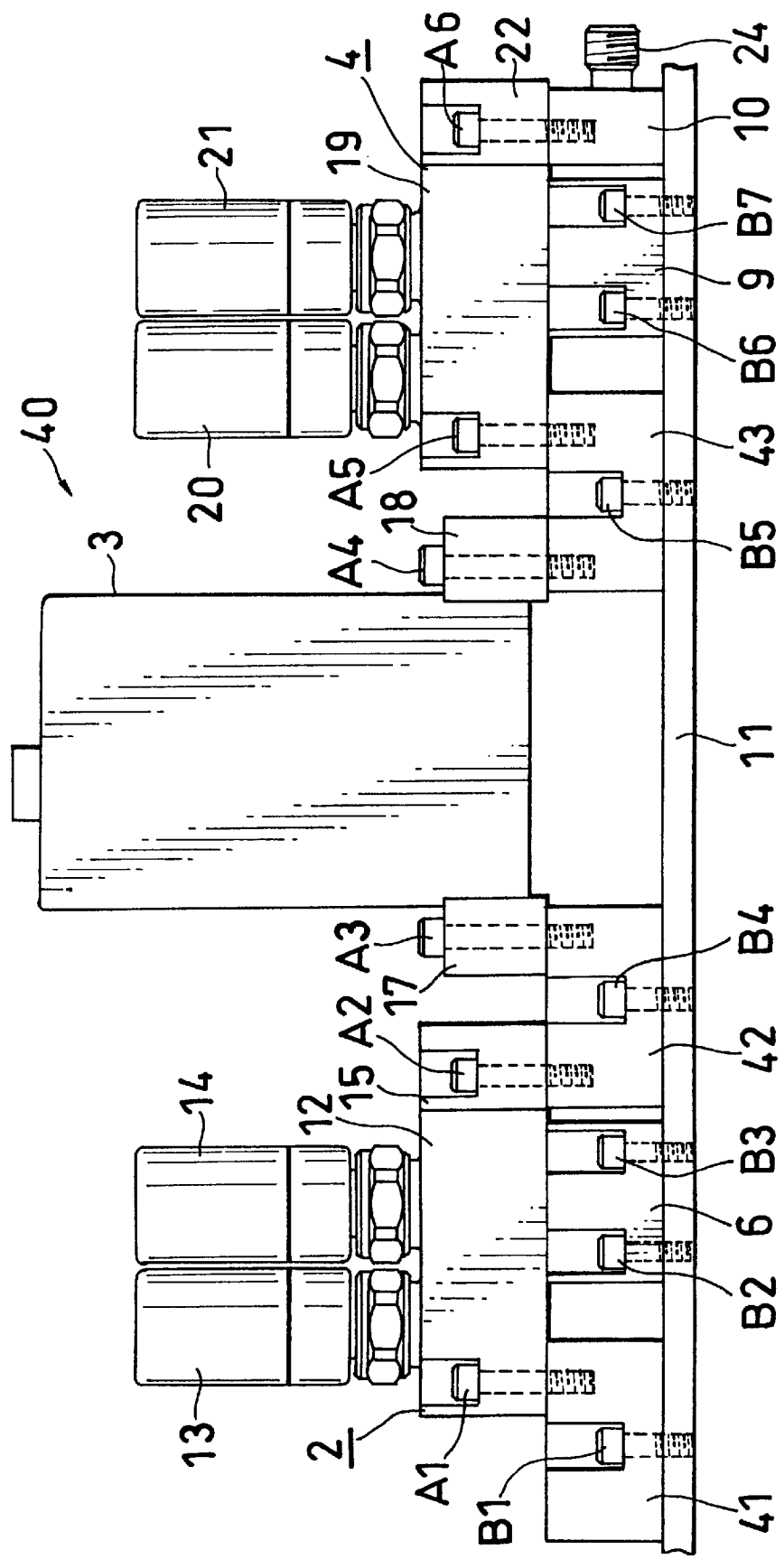
FIG. 3 is a front view of the same.
Figure 4:
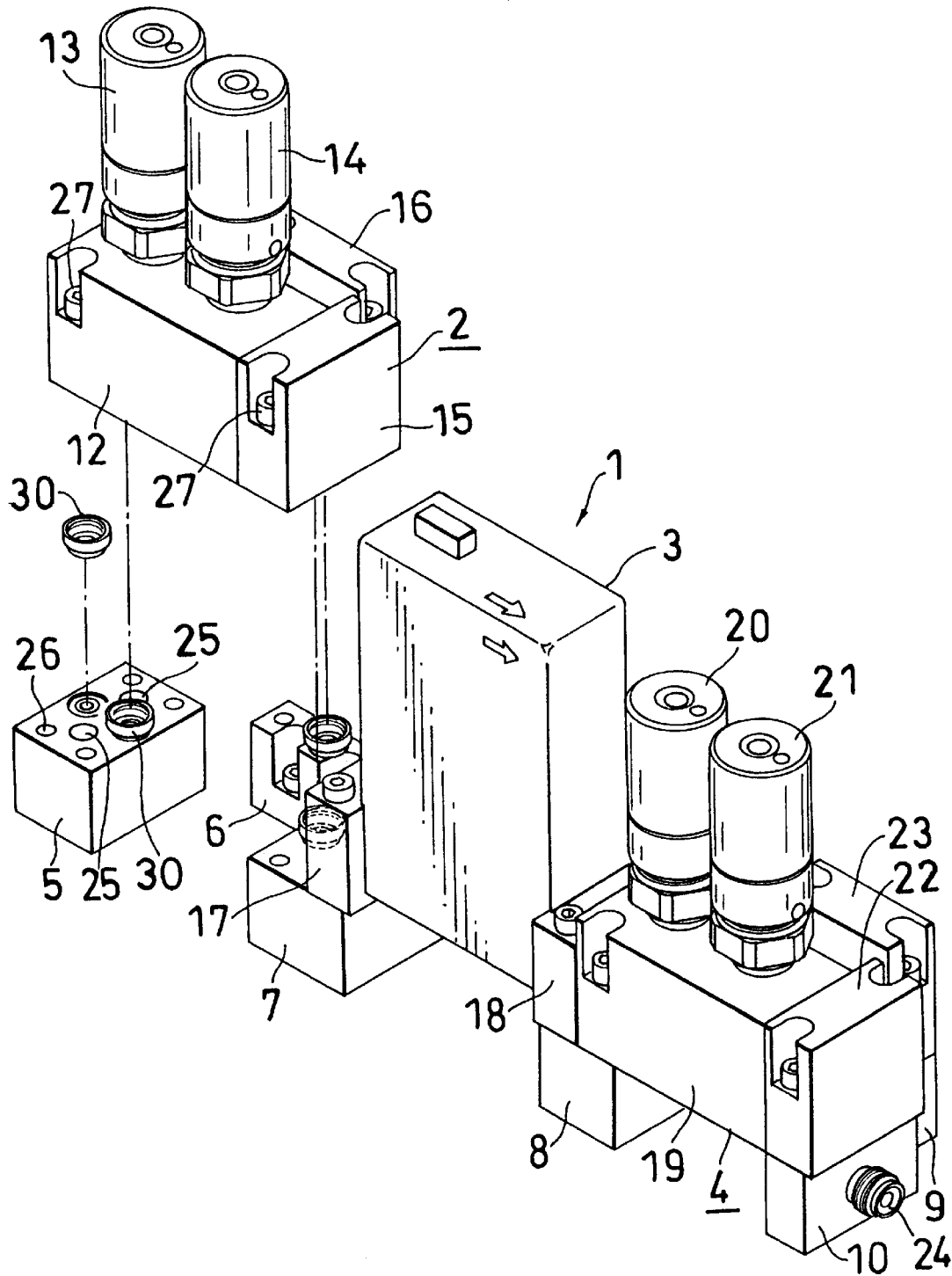
FIG. 4 is an exploded perspective view of a conventional fluid control device corresponding to the fluid control device of the invention.
Figure 5:
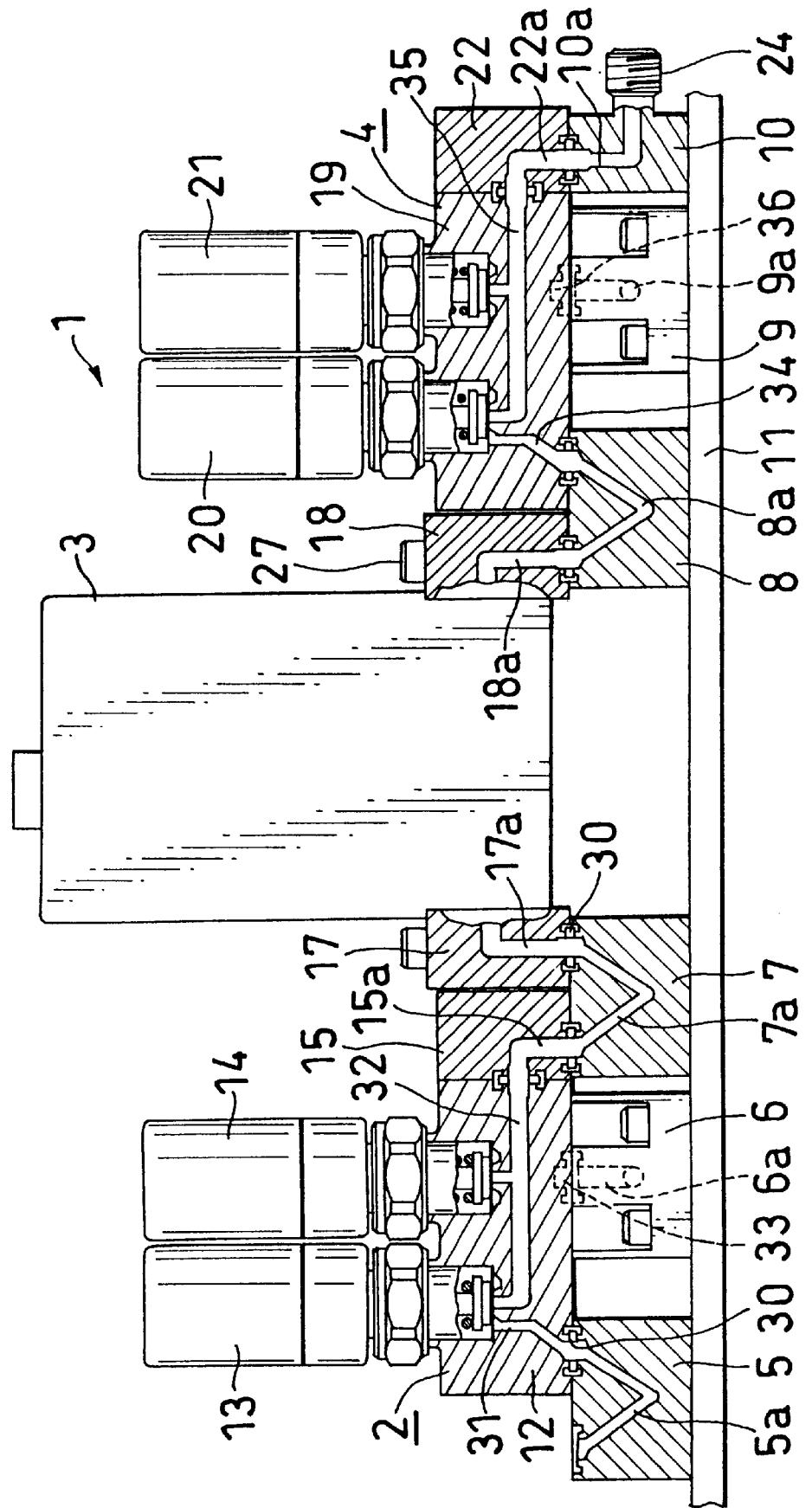
FIG. 5 is a view in vertical section of the same.

FIGS. 1 to 3 show a fluid control device 40 which embodies the invention and which differs from the fluid control device 1 shown in FIGS. 4 and 5 in the shape of the block couplings having the V-shaped channel. Throughout the drawings, like parts are referred to by like reference numerals and will not be described repeatedly.

FIGS. 1 and 2 show a block coupling 41 formed with a first V-shaped channel 41a and having mounted thereon the left end portion of body 12 of the first block valve 2, a block coupling 42 formed with a second V-shaped channel 42a and having mounted thereon the right block 15 of the first block valve 2 and the left block 17 of the massflow controller 3, and a block coupling 43 formed with a third V-shaped channel 43a and having mounted thereon the right block 18 of the massflow controller 3 and the left end portion of body 19 of the second block valve 4. These block couplings 41, 42, 43 have a greater length than the block coupling 5 having the first V-shaped channel 5a, the block coupling 7 having the second V-shaped channel 7a and the block coupling 8 having the third V-shaped channel 8a which are shown in FIGS. 4 and 5. Accordingly, the middle portions of the lengths of the couplings 41, 42, 43 are left uncovered by the respective fluid controllers 2, 3, 4. Furthermore, the V-shaped channels 41a, 42a, 43a have a greater angle of intersection than the V-shaped channels 5a, 7a, 8a shown in FIGS. 4 and 5 and are diminished in pressure loss at the intersections.

Each of the block couplings 41, 42, 43 has at its four corners screw bores 26 corresponding to the screw bores 26 of the block couplings 5, 7, 8 shown in FIGS. 4 and 5. Formed in each coupling at its midportion between the pair of adjacent screw bores 26 is a through bore 44 corresponding to each through bore 25 in each of the block couplings 5, 7, 8 shown in FIGS. 4 and 5. The block couplings 41, 42, 43 are fastened to the base plate 11 by inserting bolts 45 through the respective bores 44 and screwing the bolts 45 into respective screw bores (not shown) in the base plate 11.

The fluid controllers 2, 3, 4 are fastened to the respective pairs of adjacent block couplings 41, 42, 43 to bridge each pair by inserting bolts 27 through the controllers 2, 3, 4 from above and screwing the bolts 27 into the respective screw bores 26 in the block couplings 41, 42, 43.

Maintenance is provided for the fluid control device 40 thus constructed by the procedures to be described below with reference to FIG. 3. The screws 27 are indicated at A1 to A6, and the screws 45 at B1 to B7 in this drawing.

With reference to FIG. 3, the massflow controller 3 or the block valve 2 or 4 only can be removed singly by the same procedure as in the prior art. Stated more specifically, the first block valve 2 can be removed upward by removing the screws indicated at A1 and A2, the massflow controller 3 is removable upward by removing the screws indicated at A3 and A4, and the second block valve 4 is removable upward by removing the screws indicated at A5 and A6. To remove the massflow controller 3 with the first block valve 2 and the second block valve 4 attached to the left and right sides of the controller 3, the screws indicated at A1, B4, B5 and A6 are removed, whereby the massflow controller 3 can be removed with the first block valve 2 connected thereto by the second block coupling 42 and with the second block valve 4 connected to the controller 3 by the third block coupling 43. Similarly, the massflow controller 3 is removable with the second block valve 4 attached thereto. Thus different methods of removing are usable in accordance with the state of the device to be handled for maintenance.

In assembling the fluid control device 40 of the invention, the block couplings 41, 42, 43 are fastened to the base plate 11 by the screws B1, B4, B5, and the massflow controller 3 and the block valves 2, 4 are each fastened to some of these couplings to bridge the adjacent couplings. In this case, it is desirable to temporarily fasten the block couplings 41, 42, 43 in the first step instead of full fastening. The massflow controller 3 and the block valves 2, 4 are then mounted in the second step, and the screws B1, B4, B5 temporarily fastening the block couplings 41, 42, 43 to the base plate 11 are tightened up in the final step. The block couplings 41, 42, 43 are then slightly movable when mounting the massflow controller 3 or the block valves 2, 4, so that the controller 3 or valves 2, 4 can be mounted free of trouble even if the couplings 41, 42, 43 are not positioned with high accuracy.

The screws B1, B4, B5 for fastening the block couplings 41, 42, 43 to the base plate 11 are inserted through the bores 44 which are counterbored to accommodate the screw heads as shown in FIG. 3, whereas these screws B1, B4, B5 may have their heads projected upward beyond the upper surfaces of the couplings 41, 42, 43.

What is claimed is:

1. A fluid control device comprising a plurality of control members arranged at an upper stage and a plurality of block couplings arranged at a lower stage, the control device being characterized in that each of the fluid control members is fastened to the block couplings adjacent to each other like a bridge by screw members screwed in from above so as to render the control member removable upward, the block couplings being fastened to a base plate by screw members left uncovered with the fluid control members when seen from above.

2. A method of assembling a fluid control device comprising a plurality of control members arranged at an upper stage and a plurality of block couplings arranged at a lower stage, each of the fluid control members being fastened to the block couplings adjacent to each other like a bridge by screw members screwed in from above so as to render the control member removable upward, the block couplings being fastened to a base plate by screw members left uncovered with the fluid control members when seen from above, the assembling method comprising the first step of temporarily fastening the block couplings to the base plate with screws, the second step of fastening each of the fluid control members to the block couplings adjacent to each other like a bridge, and the third step of tightening up the screws temporarily fastening the block couplings.

* * * * *